UNITED STATES PATENT OFFICE.

WILLIAM ST. JOHN, OF NEW YORK, N. Y.

COMPOSITION OF MATTER.

1,268,404.   Specification of Letters Patent.   Patented June 4, 1918.

No Drawing.   Application filed December 27, 1917.   Serial No. 209,055.

*To all whom it may concern:*

Be it known that I, WILLIAM ST. JOHN, a citizen of the United States, residing in the borough of Manhattan, city, county, and State of New York, have invented a new and useful Improvement in Composition of Matter, of which the following is a description.

This invention relates to a composition of matter having medicinal and healing properties and characteristics and to the method for producing the same or one of its ingredients. Particularly, the invention relates to a composition to be used as a liniment or lotion for external use and for the purpose of healing wounds, skin disorders, subcutaneous ailments of various kinds, pains resulting from rheumatism, neuritis, bruises, contusions, and for allaying pain and irritation caused by burns and abrasions.

My invention resides in part in the discovery of the medicinal and curative properties of one of the by-products of "Pintsch gas," such by-product being known as "Pintsch hydrocarbon." This product is a volatile liquid, resulting from the compression of oil-gas known in the trade as "Pintsch gas," which, generally speaking, is obtained as follows:

A good quality of petroleum oil is subjected to destructive distillation in highly heated retorts or generators. The oil is thereby "cracked" or decomposed partially into gas and partially into tar. The gas carries an admixture of volatile vapors which may be condensed either by subjecting the gas to low temperatures under atmospheric pressure, or to high compression under normal temperatures, or both. That is to say, "Pintsch gas," when subjected to two (2) atmospheres pressure absolute, will lose part of said volatile vapors by condensation, and by increasing the pressure, additional condensation will take place. The product, known as "Pintsch hydrocarbon," is usually a mixture of condensates obtained under pressure from one to fifteen (1 to 15) atmospheres absolute, although in some cases partial condensates, up to three or four atmospheres pressure absolute, are collected.

"Pintsch hydrocarbon" has been used in the raw state for melting snow, and also as a powerful solvent; but, as it has a very disagreeable and penetrating odor, its use has been very objectionable, experimentally and otherwise, and, therefore, comparatively limited.

I have made the discovery, as the result of various experiments, that "Pintsch hydrocarbon" possesses valuable medicinal, antiseptic, and healing properties and characteristics, and have utilized my discovery by using and directing the use of the hydrocarbon,—crude and otherwise,—with great success in many different directions and for many different purposes. For medicinal purposes, and for general use, I subject "Pintsch hydrocarbon" to filtration so as to remove therefrom such sediment and discolorations possessed by it in its raw or crude state, and thereby obtain a limpid, clear liquid resembling water in appearance. It is volatile and still has a disagreeable odor, which I neutralize and substantially eliminate by combining therewith an aromatic oil, or an oil which has medicinal and aromatic properties. Aromatic oils of various kinds can be employed; but, I have selected for the purpose oil of wintergreen which has the effect of destroying or neutralizing the objectionable odor of the "Pintsch hydrocarbon" and thus removing objection to its use. I have selected oil of wintergreen because of its fragrance and also, because of its skin penetrating characteristics since it opens the pores of the skin. It also has the favorable characteristic of holding the "Pintsch hydrocarbon" until its medicinal and healing properties become effective.

I have found three parts of "Pintsch hydrocarbon," treated as above suggested, and one part of oil of wintergreen, approximately, when thoroughly mixed together, to be a very effective composition for all purposes; but, I desire it understood that my invention is not limited to the use of oil of wintergreen nor to the exact proportions suggested, since the latter may be varied within certain limitations and according to the particular oil which is employed. Any aromatic oil having odor neutralizing properties or characteristics and which also has the properties enabling it to soften the skin and open the pores thereof, may be substituted for oil of wintergreen; and I desire it understood that my invention comprehends any such oils combined in appropriate volume with "Pintsch hydrocarbon" as stated.

Having thus described my invention, what

I claim and desire to secure by Letters Patent is:

1. A medicament for local application comprising a limpid, colorless, volatile liquid obtained as a by-product of Pintsch gas subjected to a pressure of approximately fifteen atmospheres, and filtered.

2. A medicament for local application comprising a limpid, colorless, volatile liquid obtained as a by-product of Pintsch gas at comparatively low pressure, and an aromatic oil acting as a deodorant and also having the property of holding the said liquid in solution indefinitely.

3. A medicament for local application comprising a limpid, colorless, volatile liquid obtained as a by-product of Pintsch gas at comparatively low pressure, and an oil having the property of softening the skin and opening the pores and of holding the liquid in solution indefinitely.

4. A medicament consisting of three parts Pintsch hydrocarbon and one part of oil of wintergreen.

5. The process for producing a medicament for local application comprising subjecting Pintsch gas to comparatively low pressure to produce hydrocarbon as a by-product, subjecting said hydrocarbon to filtration, and mixing with said filtered hydrocarbon an oil having characteristics enabling it to indefinitely hold the hydrocarbon in solution and neutralize its odor.

WILLIAM ST. JOHN.